United States Patent
Spencer, V et al.

(10) Patent No.: US 8,514,105 B1
(45) Date of Patent: Aug. 20, 2013

(54) AIRCRAFT ENERGY MANAGEMENT DISPLAY FOR ENHANCED VERTICAL SITUATION AWARENESS

(75) Inventors: William F. Spencer, V, Dana Point, CA (US); John D. Tarbaux, Highland, CA (US)

(73) Assignee: The Boeing Company, Chicago, IL (US)

(*) Notice: Subject to any disclaimer, the term of this patent is extended or adjusted under 35 U.S.C. 154(b) by 437 days.

(21) Appl. No.: 12/761,184

(22) Filed: Apr. 15, 2010

Related U.S. Application Data

(60) Provisional application No. 61/295,380, filed on Jan. 15, 2010.

(51) Int. Cl.
*G01C 21/00* (2006.01)

(52) U.S. Cl.
USPC .................................. 340/977; 342/65

(58) Field of Classification Search
USPC .............. 340/977, 970; 342/65; 701/4, 14
See application file for complete search history.

(56) References Cited

U.S. PATENT DOCUMENTS

| | | | |
|---|---|---|---|
| 4,319,219 A | 3/1982 | Rein-Weston | |
| 4,758,839 A | 7/1988 | Goebel et al. | |
| 6,085,129 A | 7/2000 | Schardt et al. | |
| 6,469,640 B2 | 10/2002 | Wyatt | |
| 6,690,298 B1 | 2/2004 | Barber et al. | |
| 6,690,299 B1 | 2/2004 | Suiter | |
| 6,798,423 B2 | 9/2004 | Wilkins, Jr. et al. | |
| 6,879,886 B2 | 4/2005 | Wilkins, Jr. et al. | |
| 6,995,690 B1 | 2/2006 | Chen et al. | |
| 6,999,023 B2 * | 2/2006 | Block | 342/65 |
| 7,010,398 B2 | 3/2006 | Wilkins, Jr. et al. | |
| 7,188,007 B2 | 3/2007 | Boorman et al. | |
| 7,962,254 B2 * | 6/2011 | Bouchet et al. | 701/4 |
| 8,145,365 B2 * | 3/2012 | Flotte et al. | 701/14 |
| 2003/0184450 A1 * | 10/2003 | Muller et al. | 340/970 |
| 2006/0005147 A1 | 1/2006 | Hammack et al. | |
| 2007/0055418 A1 * | 3/2007 | Pire et al. | 701/14 |
| 2009/0267800 A1 | 10/2009 | Hammack et al. | |
| 2010/0030401 A1 | 2/2010 | Rogers et al. | |

FOREIGN PATENT DOCUMENTS

| EP | 2360453 A1 | 8/2011 |
|---|---|---|

OTHER PUBLICATIONS

"T2CAS Product Description", Aviation Communication & Surveillance Systems, May 2003, pp. 1-15 www.L-3com.com/acss.
U.S. Appl. No. 13/015,215, filed Jan. 27, 2011, Spencer V et al.
U.S. Appl. No. 12/703,944, filed Feb. 11, 2010, Sharkany et al.
U.S. Appl. No. 12/751,144, filed Mar. 31, 2010, Spencer V et al.
"Height-velocity diagram", Wikipedia, pp. 1-2, retrieved Aug. 30, 2010 http://en.wikipedia.org/wiki/Height-velocity_diagram.
"File:Hvcurve.png", Wikipedia, pp. 1-3, retrieved Sep. 7, 2010 http://en.wikipedia.org.wikiFile:Hvcurve.png.
Spencer, V, "Display of Climb Capability for an Aircraft Based on Potential States for the Aircraft," USPTO U.S. Appl. No. 13/217,773, filed Aug. 25, 2011, 85 pages.
European Search Report, dated May 25, 2011, regarding Application No. EP11153457.4, 6 pages.

\* cited by examiner

*Primary Examiner* — John A Tweel, Jr.
(74) *Attorney, Agent, or Firm* — Yee & Associates, P.C.

(57) ABSTRACT

The advantageous embodiments provide a method and apparatus for presenting information to operate an aircraft over terrain. A vertical profile view of the terrain is displayed relative to a location of the aircraft. A number of curves are displayed on the vertical profile view. The number of curves identifies a number of maximum heights of the terrain that the aircraft can clear based on a current state of the aircraft.

37 Claims, 9 Drawing Sheets

AIRCRAFT ENERGY MANAGEMENT DISPLAY FOR ENHANCED VERTICAL SITUATION AWARENESS

RELATED PROVISIONAL APPLICATION

This application is related to and claims the benefit of priority of provisional U.S. Patent Application Ser. No. 61/295,380, filed Jan. 15, 2010, entitled "Aircraft Energy Management Display for Enhanced Vertical Situation Awareness", which is incorporated herein by reference.

GOVERNMENT LICENSE RIGHTS

This application was made with Government support under contract number F33657-01-C-0047 awarded by the United States Air Force. The Government has certain rights in this application.

BACKGROUND INFORMATION

1. Field

The present disclosure relates generally to aircraft and, in particular, to a method and apparatus for presenting information during flight of an aircraft. Still more particularly, the present disclosure relates to a method and apparatus for presenting information for vertical situation awareness that facilitates energy management in an aircraft.

2. Background

Different types of aircraft may fly close to or follow the terrain to perform different types of operations. For example, agricultural aircraft, such as crop dusters, fly at low altitudes over fields to apply pesticides to crops. Some types of passenger and freight aircraft fly close mountainous terrain to deliver passengers and/or cargo to high-elevation airports. Fire fighting air tankers fly close to the terrain to drop water or fire retardant onto or around a fire. Most helicopters fly near terrain throughout their flights.

Military aircraft may fly close to the terrain to drop cargo and paratroops or to avoid detection. The military aircraft may fly within a valley, behind a ridge, or close to some other terrain in a manner that may mask the military aircraft's signature in the ground clutter.

Some aircraft may use terrain following systems. A terrain following system is a guidance system that allows an aircraft to fly safely close to the ground. Further, with the terrain following system, the aircraft may fly safely over terrain, such as valleys or mountains. This type of system may allow an aircraft to fly at night or with no visibility.

Terrain following systems have been used in various military aircraft, such as bombers, fighters, and airlift aircraft. These terrain following systems offer an operator of an aircraft cues to steer the aircraft so as to maintain a desired height above the terrain. Terrain following systems use a display to provide these cues to the operator of the aircraft. These cues may be, for example, graphical indicators, text in windows, and/or other suitable types of cues.

Although a terrain following system may be used for different types of operations, these systems are expensive and require a greater amount of pilot training and practice than desired.

Other aircraft may not include a terrain following system that is designed to guide the pilot to maintain a substantially constant terrain clearance. Instead, these aircraft may have a warning system that is designed to prevent an accidental approach to terrain between takeoff and landing of an aircraft. These types of systems, however, may not be helpful in aiding a pilot intentionally flying close to the ground after takeoff and before landing.

Without a terrain following system, an aircraft may be grounded at night or in low visibility conditions. These conditions include, for example, rain, snow, and fog. Further, without a terrain following system, an aircraft may not be able to fly close enough to the terrain to perform certain types of operations. As one example, fire fighting air tankers are typically grounded at night.

Therefore, it would be advantageous to have a method and apparatus that takes into account one or more of the issues discussed above, as well as possibly other issues.

SUMMARY

In one advantageous embodiment, a method is present for presenting information to operate an aircraft over terrain. A vertical profile view of the terrain is displayed relative to a location of the aircraft. A number of curves are displayed on the vertical profile view. The number of curves identifies a number of maximum heights of the terrain that the aircraft can clear based on a current state of the aircraft.

In another advantageous embodiment, a method is present for presenting information about terrain. A vertical profile view of the terrain is displayed relative to a location of a vehicle. A number of curves are displayed on the vertical profile view. The number of curves identifies a number of maximum heights of the terrain that the vehicle can clear based on a current state of the vehicle.

In yet another advantageous embodiment, an apparatus comprises a display device, a storage device, program code stored on the storage device, and a processor unit configured to run the program code. The program code is run to display a vertical profile view of terrain relative to a location of an aircraft on the display device. The program code is run to display a number of curves on the vertical profile view on the display device. The number of curves identifies a number of maximum heights of the terrain that the aircraft can clear based on a current state of the aircraft.

The features, functions, and advantages can be achieved independently in various embodiments of the present disclosure or may be combined in yet other embodiments in which further details can be seen with reference to the following description and drawings.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
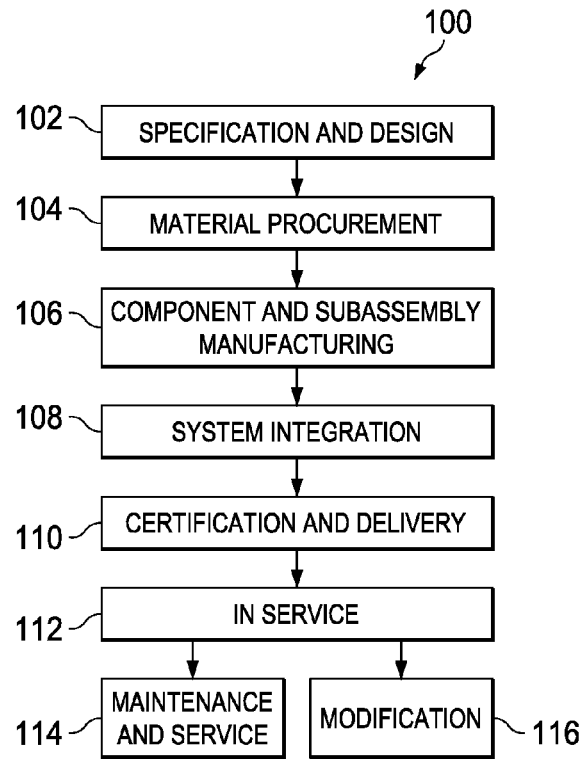
FIG. 1 is an illustration of an aircraft manufacturing and service method in accordance with an advantageous embodiment.
Figure 2:
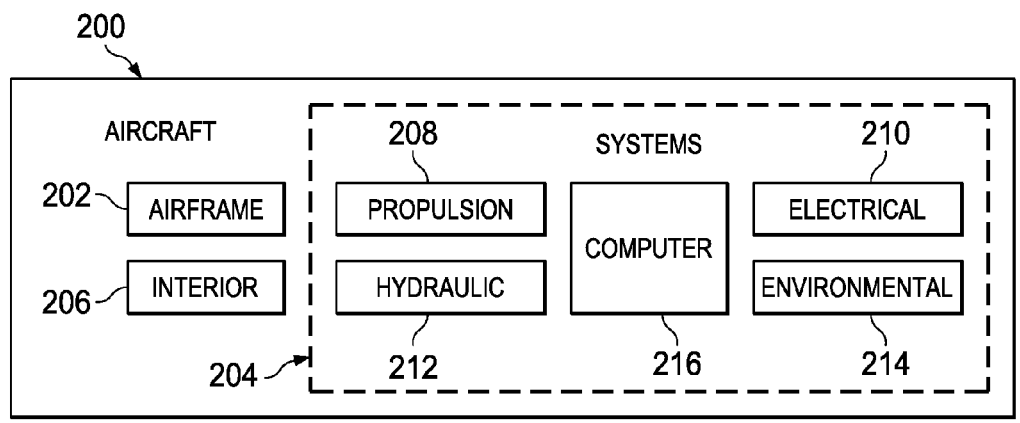
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114. While in service 112 by a customer, aircraft 200 may also be scheduled for modification 116. In this illustrative example, modification 116 may include modification, reconfiguration, refurbishment, improvements, and/or other types of modifications.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and computer system 216. Any number of other systems may be included. Although an aerospace example is shown, different advantageous embodiments may be applied to other industries, such as, for example, without limitation, the submarine or spacecraft industry.

Apparatus and methods embodied herein may be employed during at least one of the stages of aircraft manufacturing and service method 100 in FIG. 1. In the different illustrative examples, one or more advantageous embodiments may be implemented in computer system 216 during one or more stages of aircraft manufacturing and service method 100.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in maintenance and service 114 and modification 116 in FIG. 1.

As yet another illustrative example, a number of apparatus embodiments, method embodiments, or a combination thereof may be utilized aircraft 200 is in service 112 in FIG. 1. As yet another example, a number of apparatus embodiments, method embodiments, or a combination thereof may be fabricated or manufactured and installed into an aircraft 200 during modification 116 in FIG. 1.

A number, when referring to items, means one or more items. For example, a number of apparatus embodiments is one or more apparatus embodiments. The use of a number of the different advantageous embodiments may increase the utility of aircraft 200 and the safety of operation of aircraft 200.

The different advantageous embodiments recognize and take into account a number of different considerations as discussed below. For example, the different advantageous embodiments recognize and take into account that other types of systems may be used in addition to a terrain following system to provide pilots an awareness of their vertical situation on a continual basis during the flight of the aircraft.

The different advantageous embodiments recognize and take into account that one manner in which pilots may take into account their vertical situation awareness is to use a global positioning system receiver, a display of a map, and/or stored terrain data. This type of system, however, requires increased pilot workload and also may require a pilot to have increased margins in their climbs to ensure safety. Flying with increased margins may involve, for example, without limitation, climbing sooner, descending later, and/or flying higher.

The different advantageous embodiments recognize and take into account that different types of aircraft may have different climb capabilities. For example, identifying the climb capability for an aircraft with respect to a terrain may require extensive pilot experience and training. This identification of the climb capability may include identifying when to start a climb or stop a descent. Further, the different advantageous embodiments recognize and take into account that as the weight of the aircraft changes during flight, the climb capability of an aircraft changes. For example, if cargo is deployed from the aircraft and/or when fuel is used, the climb capability of an aircraft changes.

As a result, the different advantageous embodiments recognize and take into account that even with the use of global positioning system receivers, displays of maps, and stored terrain data, many aircraft may be unable to fly at low altitudes at night. This situation may occur because of a lack of precise knowledge of the energy state of an aircraft with respect to the terrain over which the aircraft is flying. For example, a pilot of an aircraft may not have the knowledge needed to safely clear the terrain through climbs and descents when flying at low altitudes at night.

Thus, the different advantageous embodiments provide a method and apparatus for presenting pilots with an awareness of their vertical situation. The information may be provided on a continual basis to show a comparison of the energy state and climb capability of the aircraft with respect to terrain that is below and ahead of the aircraft. The different advantageous embodiments may be implemented in existing guidance systems. For example, one or more advantageous embodiments may be included in a terrain following system. In yet other advantageous embodiments, the information may be provided using additional systems.

In one or more advantageous embodiments, a method and apparatus are present for presenting data with an energy state of an aircraft. This energy state may be presented in the form of information identifying climb capabilities of an aircraft relative to the terrain below and in front of the aircraft. This information may be used to permit an operator of an aircraft to perform operations to safely climb and clear terrain. Further, this information may be used to permit an operator of an aircraft to perform operations to climb and clear terrain with a desired precision.

In one or more advantageous embodiments, the vertical profile view of the terrain is displayed relative to a location of an aircraft. A number of curves on the vertical profile view are displayed. The number of curves identifies a number of maximum heights above the terrain that the aircraft can clear based on the current state of the aircraft.

Figure 3:
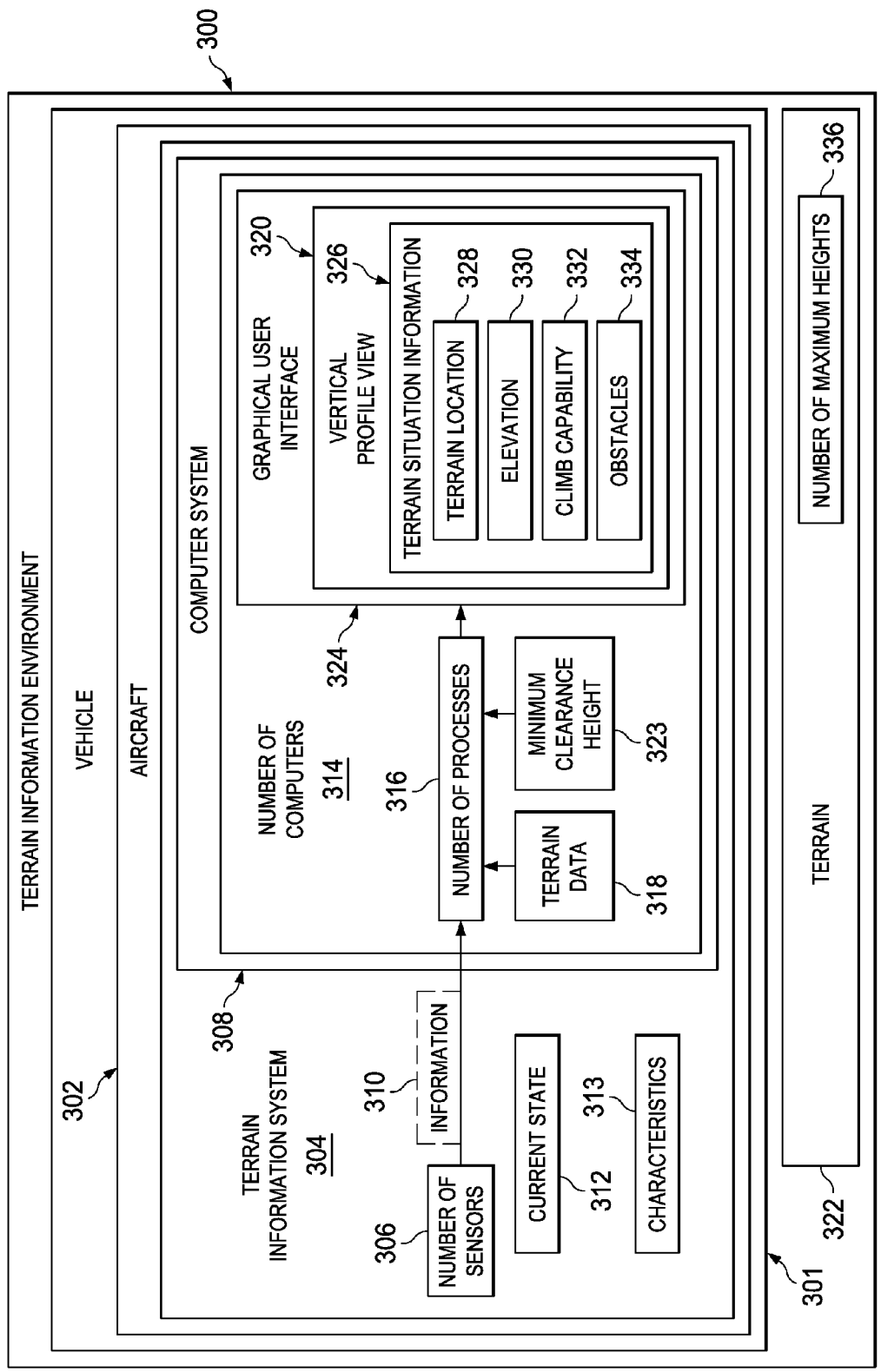
FIG. 3 is an illustration of a terrain information environment in accordance with an advantageous embodiment.

Turning now to FIG. 3, an illustration of a terrain information environment is depicted in accordance with an advantageous embodiment. Terrain information environment 300 may be implemented for vehicle 301. Vehicle 301 may take the form of aircraft 302 in these illustrative examples. Aircraft 302 is an example of one implementation for aircraft 200 in FIG. 2.

In this illustrative example, aircraft 302 includes terrain information system 304. Terrain information system 304 may include number of sensors 306 and computer system 308. These components are associated with aircraft 302.

Number of sensors 306 generates information 310 about current state 312 of aircraft 302. Information 310 is sent to computer system 308. Computer system 308 uses information 310 to identify current state 312 of aircraft 302. Information 310 used to identify current state 312 may include, for example, without limitation, at least one of an aircraft condition, an aircraft position, an aircraft movement, an aircraft system status, atmospheric measurements, design characteristics of the aircraft, an/or other suitable information.

An aircraft condition may include, without limitation, gross weight, flap position, landing gear position, and door position. An aircraft position may include, without limitation, a location of aircraft 302 in three-dimensional space, altitude, attitude, pitch angle, and roll angle. An aircraft movement may include, without limitation, airspeed, ground speed, vertical velocity, vertical acceleration, pitch rate, ground track angle, and turn rate. An aircraft system status may include, for example, without limitation, engine power. Engine power is the torque of the engine of aircraft 302 multiplied by the engine speed of aircraft 302. Atmospheric measurements may include, without limitation, air pressure, air density, air temperature, wind speed, and direction.

Information 310 for identifying current state 312 may also include, for example, without limitation, pilot settings such as reaction or warning time, pull-up and pushover acceleration, and climb angle limit. Further, information 310 may also include, for example, without limitation, information for identifying a number of future states of aircraft 302. A future state is a state of the aircraft at a point in time that has not yet occurred.

The number of future states may be based on at least one of current state 312 of aircraft 302, a flight plan for aircraft 302, user input, and other suitable factors. For example, the user input may include a pilot setting, such as a future groundspeed, future altitude, future bank angle, future gross weight, and/or other some other suitable setting.

Characteristics 313 for aircraft 302 may also be used to identify current state 312. Characteristics 313 may include, for example, without limitation, aircraft stall speed for a given gross weights and flap positions, aircraft drag characteristics for aircraft configuration variations, yawing moment due to an engine out, engine power available for given airspeeds, air densities, air temperatures, and/or other suitable characteristics for aircraft 302. Aircraft configuration variations include, for example, positions for landing gear, flaps, and doors.

In these illustrative examples, computer system 308 comprises number of computers 314. When number of computers 314 includes two or more computers, these computers may be in communication with each other using a communications fabric, such as a network. Number of processes 316 running on number of computers 314 processes information 310 to identify current state 312 of aircraft 302.

Additionally, number of processes 316 uses both current state 312 and terrain data 318 to create vertical profile view 320 of terrain 322 over which aircraft 302 is flying and ahead of aircraft 302. Terrain data 318 is stored terrain data in these illustrative examples. For example, terrain data 318 may be stored in a database. In other illustrative examples, terrain data 318 may be obtained from at least one of number of sensors 306. For example, terrain data 318 may be obtained from a radar sensor in number of sensors 306.

Terrain data 318 is data about the elevation of terrain. Terrain data 318 also may include the identification of different features. For example, terrain data 318 also may include information identifying mountains, valleys, and other suitable information. Further, terrain data 318 also may include identification of different geographical boundaries, such as countries, states, cities, counties, airspace, and other suitable information. Airspace may include, for example, without limitation, restricted airspace, terminal airspace, military operations airspace, and/or other suitable types of airspace.

Terrain data 318 also includes information about obstacles to aviation. Obstacles are manmade objects in these illustrative examples. These obstacles may include, for example, without limitation, power lines, buildings, radio frequency towers, and other obstacles.

Vertical profile view 320 is presented on graphical user interface 324 within computer system 308. Vertical profile view 320 provides terrain situation information 326 for use by an operator of aircraft 302. Terrain situation information 326 is information that provides an operator information about an aircraft relative to terrain. Terrain situation information 326 may take a number of different forms. Terrain situation information 326 may be presented as icons, curves, text, or other types of information. Further, in some cases, terrain situation information 326 may be presented audibly in addition to or in place of being displayed on graphical user interface 324.

In these illustrative examples, terrain situation information 326 includes at least one of terrain elevation 330, terrain location 328, climb capability 332, obstacles 334, and other suitable information. Terrain elevation 330 may include, for example, without limitation, an identification of the type of terrain, or an identification of the elevation of the terrain with respect to the aircraft. In these examples, terrain elevation 330 may be in the form of an outline or shapes displayed relative to the aircraft on vertical profile view 320.

Terrain location 328 may include an identification of a number of particular locations of terrain 322 at different points or locations on vertical profile view 320. In other words, terrain location 328 may be an identification of the height of a portion of terrain elevation 330. For example, terrain location 328 may identify a top of a mountain in terrain elevation 330. Obstacles 334 are an identification of man-made structures that may be on terrain elevation 330.

Climb capability 332 is information about the ability of aircraft 302 to climb to higher altitudes over a distance. In the context of terrain situation information 326 on vertical profile view 320, climb capability 332 provides information about the ability of aircraft 302 to climb with respect to terrain elevation 330 and obstacles 334.

With terrain situation information 326, an operator of aircraft 302 can identify number of maximum heights 336 of terrain 322 that aircraft 302 can clear based on current state 312 of aircraft 302. Number of maximum heights 336 changes as relative elevation 330 of terrain 322 changes.

Number of maximum heights 336, over which aircraft 302 can clear terrain 322, are the maximum terrain heights over which aircraft 302 can climb while maintaining minimum clearance height 323 over terrain 322 in these illustrative examples. In these illustrative examples, minimum clearance height 323 is a selected height above terrain 322. For example, minimum clearance height 323 may be a minimum height above terrain 322 that aircraft 302 is to maintain while flying over terrain 322. Minimum clearance height 323 may be selected based on rules, policies, safety requirements, pilot setting, and/or other suitable factors.

In these illustrative examples, minimum clearance height 323 may be displayed as a minimum terrain clearance distance.

With terrain situation information 326, an operator of aircraft 302 may be able to more easily identify information with respect to the location of aircraft 302 relative to terrain 322. Further, an operator may be more easily able to identify changes in the operation of aircraft 302 that may be needed or desired to fly over terrain 322 in a desired manner. In these illustrative examples, climb capability 332 is information that may provide the operator an ability to manage energy of aircraft 302, change engine power, or perform other maneuvers. These maneuvers may be performed with respect to the capability of aircraft 302 to climb based on current state 312. Climb capability 332 may provide the operator an ability, given the energy of aircraft 302 based on current state 312, to select a time or location to initiate climbs to safely clear terrain elevation 330.

Also, with terrain situation information 326, an operator may have more information that may allow the operator to fly in conditions, such as darkness, fog, and/or other situations that may obscure the visibility of terrain 322. The manner in which terrain situation information 326 is generated and presented is described in more detail with respect to the figures described below.

The illustration of terrain information environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, number of processes 316 may be located in other locations other than on aircraft 302. For example, number of processes 316 may be located in a remote computer system on another aircraft or on the ground.

Further, although this illustrative example is depicted with respect to an aircraft, other advantageous embodiments may be implemented using other types of platforms. For example, vehicle 301 may take the form of an airplane, a helicopter, an unmanned aircraft system, a submarine, an unmanned underwater vehicle, a spacecraft, or some other suitable type of vehicle. For example, when implemented for an unmanned vehicles including, without limitation, unmanned aircraft system, unmanned underwater vehicle, or unmanned spacecraft, graphical user interface 324 may be located in a remote computer system used by a remote pilot or operator.

Figure 4:
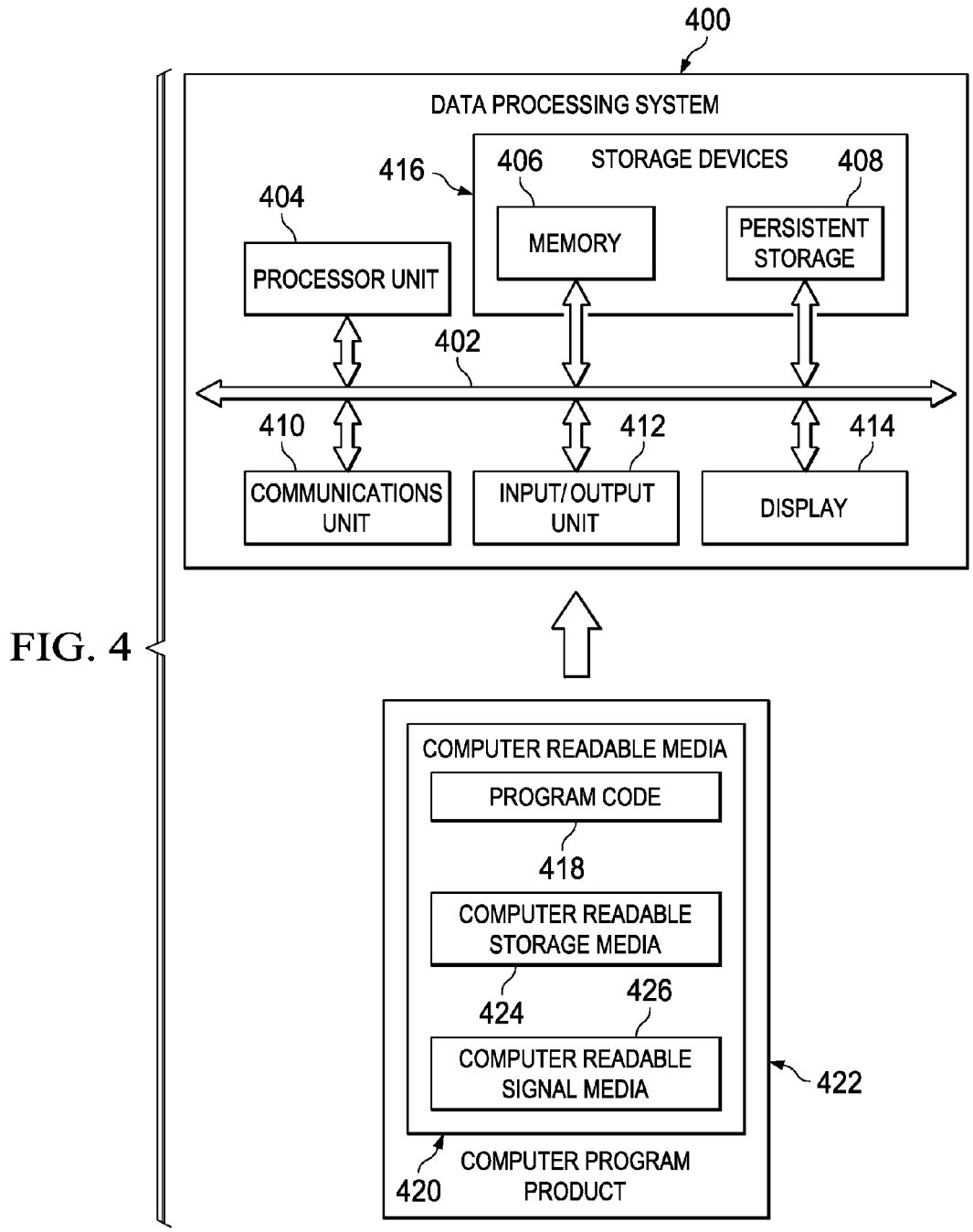
FIG. 4 is an illustration of a data processing system in accordance with an advantageous embodiment.

Turning now to FIG. 4, an illustration of a data processing system is depicted in accordance with an advantageous embodiment. Data processing system 400 is an example of a data processing system that may be used to implement a computer within number of computers 314 within computer system 308 in FIG. 3. For example, data processing system 400 may take the form of an electronic flight bag, a flight management system, a navigation system, or some other suitable type of computer that may be associated with an aircraft. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis.

Memory 406, in these examples, may be, for example, a random access memory or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
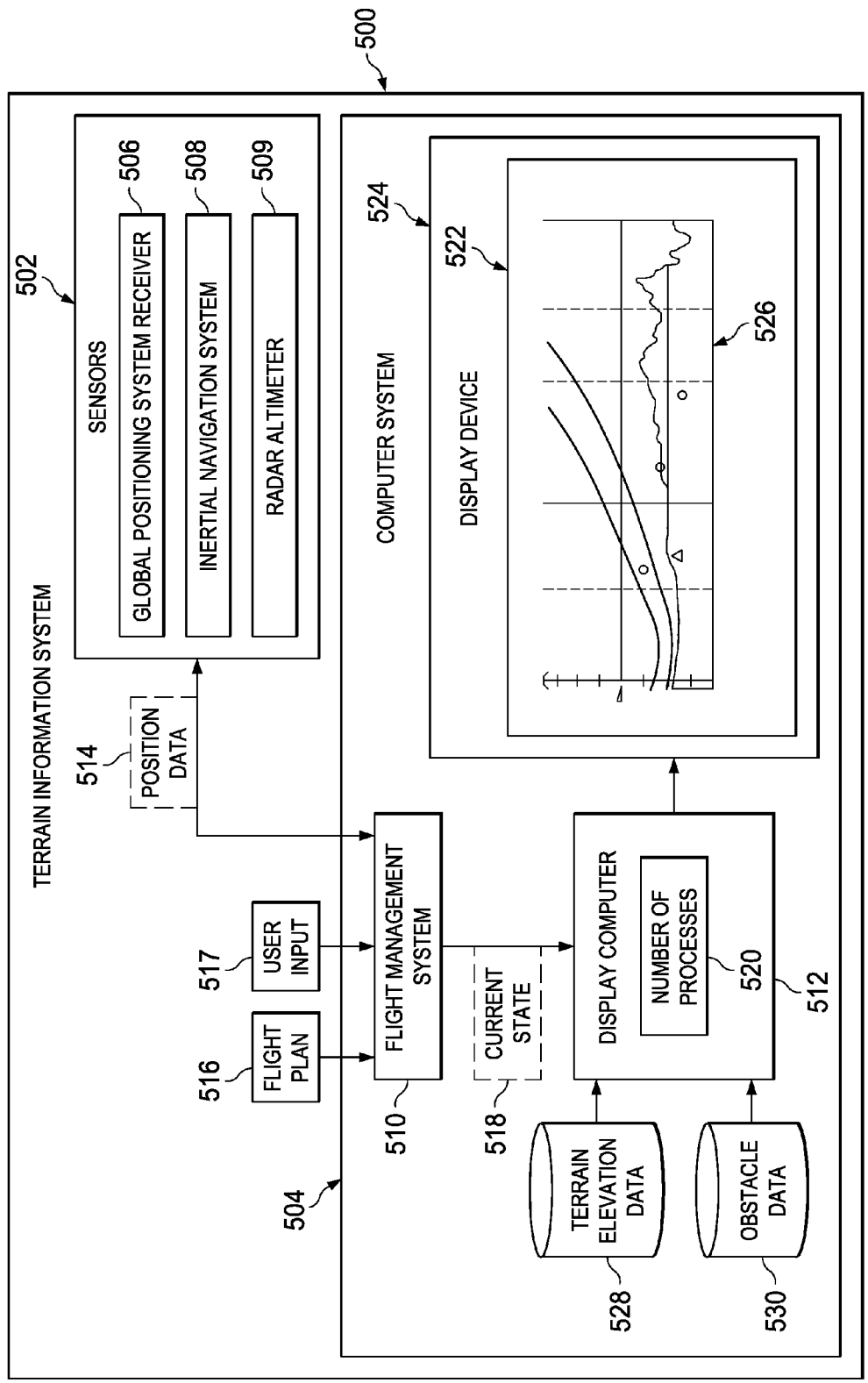
FIG. 5 is an illustration of a terrain information system in accordance with an advantageous embodiment.

With reference now to FIG. 5, an illustration of a terrain information system is depicted in accordance with an advantageous embodiment. In this illustrative example, terrain information system 500 is an example of one implementation for terrain information system 304 in FIG. 3.

In this illustrative example, terrain information system 500 comprises sensors 502 and computer system 504. Sensors 502 are an example of one implementation for number of sensors 306 in FIG. 3. Sensors 502, in this example, include global positioning system receiver 506, inertial navigation system 508, and radar altimeter 509. Sensors 502 are connected to computer system 504.

In this example, computer system 504 is an example of one implementation for computer system 308 in FIG. 3. Computer system 504 comprises flight management system 510 and display computer 512. As depicted, flight management system 510 receives position data 514 from sensors 502. Additionally, flight management system 510 also receives flight plan 516 and user input 517.

Position data 514 provides the current position of the aircraft. Position data 514 may include, for example, longitude, latitude, altitude above terrain, a timestamp, and/or other suitable information. Additionally, position data 514, in some examples, also may include a speed, a climb angle, a turn rate, and other suitable types of data. Flight plan 516 is information about the route that the aircraft uses for a flight from a start location to an end location.

In these illustrative examples, user input 517 includes information that may be input into flight management system 510 by an operator of an aircraft. For example, a pilot or other crew member of an aircraft may enter a gross weight of the aircraft, changes to flight plan 516, and/or other information.

Flight management system 510 uses position data 514, flight plan 516, and/or user input 517 to generate current state 518 for the aircraft. Current state 518 may be current state 312 in FIG. 3. Current state 518 includes at least one of aircraft condition, an aircraft position, an aircraft movement, an aircraft system status, atmospheric measurements, design characteristics of the aircraft, and other suitable information. For example, current state 518 may include position, current airspeed, current ground speed, gross weight, bank angle, pitch, and other suitable information. Current state 518 is sent to display computer 512.

Number of processes 520 run on display computer 512. Number of processes 520 generates graphical user interface 522 on display device 524. Number of processes 520 generates terrain information 526 using terrain elevation data 528, obstacle data 530, and current state 518. Terrain information 526 is displayed on graphical user interface 522.

Terrain elevation data 528 and obstacle data 530 are examples of terrain data 318 in FIG. 3. Terrain elevation data 528 includes elevation information for the terrain. In these examples, terrain elevation data 528 is for naturally occurring terrain. Obstacle data 530 provides information about manmade objects that may be present. These manmade objects may include, for example, without limitation, radio towers, buildings, power lines, and other suitable types of obstacles.

Figure 6:
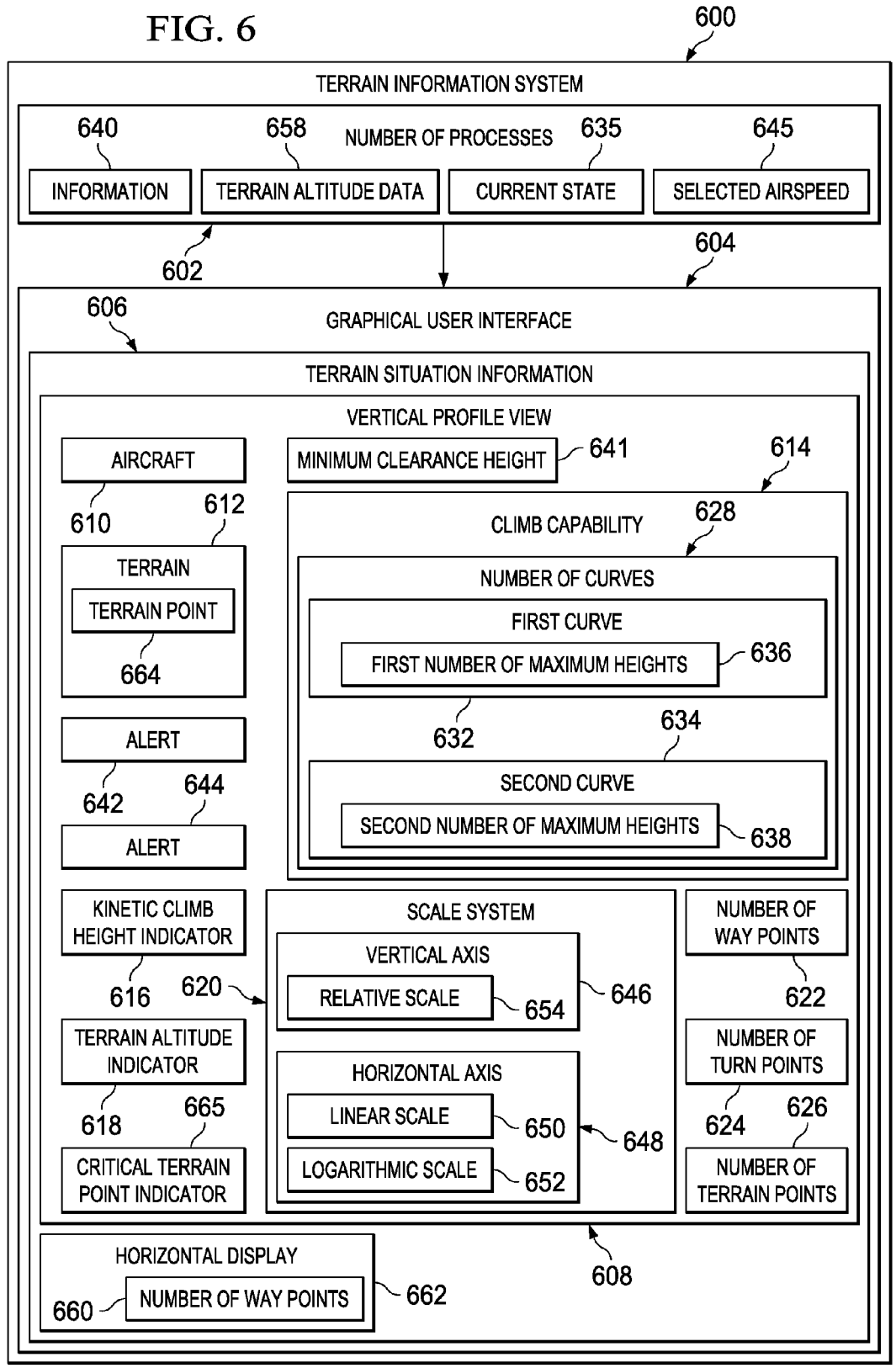
FIG. 6 is an illustration of a terrain information system in accordance with an advantageous embodiment.

With reference now to FIG. 6, an illustration of a terrain information system is depicted in accordance with an advantageous embodiment. Terrain information system 600 is an example of one implementation for terrain information system 304 in FIG. 3. In this illustrative example, software processes, components, and data structures in terrain information system 600 are illustrated.

In this illustrative example, number of processes 602 and graphical user interface 604 are used to present terrain situation information 606 to a user. These components may be implemented in a computer system, such as computer system 308 in FIG. 3.

In this illustrative example, number of processes 602 generates terrain situation information 606 for display on graphical user interface 604. Terrain situation information 606 is displayed as vertical profile view 608 on graphical user interface 604. Terrain situation information 606 is an example of terrain situation information 326 in FIG. 3.

As depicted, vertical profile view 608 includes aircraft 610. Aircraft 610 is an icon representing an aircraft, such as, for example, aircraft 302 in FIG. 3. Aircraft 610 is displayed in vertical profile view 608 in a position relative to terrain 612. In this manner, aircraft 610 may represent the position of the aircraft relative to the actual terrain.

Additionally, terrain situation information 606 also includes a presentation of at least one of climb capability 614, kinetic climb height indicator 616, terrain altitude indicator 618, scale system 620, number of way points 622, number of turn points 624, number of terrain points 626, and other suitable information. In these examples, each of number of terrain points 626 is a different location in terrain 612.

In the illustrative examples, climb capability 614 is an example of one manner in which climb capability 332 in FIG. 3 may be presented. As depicted, climb capability 614 is presented in the form of number of curves 628. Number of curves 628 provides information about a number of maximum heights over which an aircraft can clear terrain in a desired manner. Each value in the number of maximum heights may be different from another value in the number of maximum heights. In other words, the number of maximum heights changes as a function of the distance of terrain 612 from the aircraft. This number of maximum heights changes as terrain 612 changes.

As illustrated, number of curves 628 includes first curve 632 and second curve 634. First curve 632 and second curve 634 are generated using current state 635 of the aircraft. Current state 635 may be current state 312 in FIG. 3. Current state 635 includes at least one of aircraft condition, an aircraft position, an aircraft movement, an aircraft system status, atmospheric measurements, design characteristics of the aircraft, and other suitable information.

In these illustrative examples, current state 635 of the aircraft may comprise at least one of a current airspeed, a current ground speed, a climb angle, a load factor, a bank angle, and a climb capability of the aircraft. The climb capability of the aircraft may be obtained using information, such as, for example, without limitation, a density altitude, an engine capability, drag, and gross weight of the aircraft.

First curve 632 is displayed on vertical profile view 608 and identifies first number of maximum heights 636 over which an aircraft can clear when climbing and then change to substantially level flight.

Second curve 634 also is displayed on vertical profile view 608. Second curve 634 identifies second number of maximum heights 638 over which the aircraft can clear terrain 612 without taking into account whether the aircraft can change to substantially level flight. In other words, the aircraft may clear terrain 612 but may not be able to change to a substantially level flight. More specifically, the aircraft may clear terrain 612, but also may have a climb angle that is greater than zero.

Further, in these illustrative examples, when an aircraft climbs over terrain 612 while keeping terrain 612 below first curve 632, the aircraft may have a greater safety margin as compared to when climbing over terrain 612 while keeping terrain 612 below second curve 634. The safety margin is the distance above terrain 612.

In these illustrative examples, current state 635 of the aircraft may change continuously during flight. For example, current state 635 may change in response to the use of fuel, a change in the gross weight of aircraft 302, a change in airspeed, a change in ground speed, or some other suitable change. Number of curves 628 may change continuously or periodically as current state 635 of the aircraft changes.

In this manner, number of curves 628 provides the capability to identify climb capability 614 relative to terrain 612 in vertical profile view 608. Climb capability 614 is for terrain 612 below and ahead of the aircraft. In these illustrative examples, first curve 632 and second curve 634 are generated using information 640.

Information 640 is received from different sensors in the aircraft in these illustrative examples. Information 640 may include, for example, without limitation, the speed of the aircraft, the climb angle, bank angle, turn rate, gross weight, aircraft configuration, ground speed, air density, density altitude, temperature, and other suitable information.

Minimum clearance height 641 below the aircraft may be used in the generation of first curve 632 and/or second curve 634. Minimum clearance height 641 may be a preselected value. Minimum clearance height 641 may be selected based on the height of the aircraft, rules, policies, safety requirements, and/or other factors. Additionally, minimum clearance height 641 also may be selected based on a user input from an operator of the aircraft.

As one illustrative example, first curve 632 may begin at a position below aircraft 610 on vertical profile view 608 by minimum clearance height 641. In other words, first curve 632 may be translated below aircraft 610 by minimum clearance height 641.

If terrain 612 penetrates first curve 632, alert 642 may be generated to provide an alert to an operator. Alert 642 indicates that substantially level flight may not occur after clearing the terrain for the state of the aircraft. In other words, in current state 635 of the aircraft, substantially level flight may not occur when clearing terrain 612. In other words, the state of the aircraft may need to change to be able to obtain substantially level flight after clearing the portion of the terrain 612.

In these illustrative examples, second curve 634 may begin at a position below aircraft 610 on vertical profile view 608 by a distance substantially equal to minimum clearance height 641. In other illustrative examples, second curve 634 may begin at a position below aircraft 610 by a distance that is a percentage of minimum clearance height 641. This percentage may be, for example, about 70 percent. In other words, second curve 634 may begin at a position below aircraft 610 at a distance substantially equal to about 70 percent of minimum clearance height 641.

If second curve 634 intersects terrain 612, alert 644 may be generated. Alert 644 may be presented in vertical profile view 608. In other words, in these illustrative examples, alert 644 indicates that with current state 635 of the aircraft, the aircraft cannot clear terrain 612 at substantially minimum clearance height 641. As a result, alert 644 indicates that the aircraft cannot clear the terrain for the state of the aircraft and that action may need to be taken to avoid contact with terrain 612. This action may be, for example, without limitation, at least one of increasing engine power, decreasing airspeed, changing the climb angle, turning, and/or some other suitable operation.

First curve 632 and second curve 634, alert 642, and alert 644 may be presented in a number of different ways. In these illustrative examples, first curve 632 and second curve 634 may be presented using different colors, line thicknesses, line types, or other types of graphical indicators to distinguish these curves from each other.

For example, first curve 632 may be presented using blue, while second curve 634 may be presented using red. Further, the different maximum heights may be identified as the spaces below first curve 632 and second curve 634. For example, these spaces may be colored or shaded. Further, these spaces may include annotations to provide a better indication of the differences in maximum heights.

For example, terrain 612 may be presented in different colors at different relative altitudes from the aircraft. As a specific example, red may be used for terrain 612 above the height of the aircraft. Yellow may be used for terrain 612 between the height of the aircraft and minimum clearance height 641. Green or black may be used for terrain 612 below minimum clearance height 641.

Alert 642 and alert 644 may be presented using graphical indicators in the form of graphical icons, text, or other suitable indicators. Further, alert 642 and alert 644 also may be presented using sound in addition to or in place of the graphical indicators.

In these illustrative examples, scale system 620 comprises vertical axis 646 and horizontal axis 648. Scale system 620 may include a combination of linear scale 650 and logarithmic scale 652 on horizontal axis 648. For example, a first portion of horizontal axis 648 may be displayed using a linear scale, while a second portion of horizontal axis 648 may be displayed using a logarithmic scale.

In these depicted examples, the transition between linear scale 650 and logarithmic scale 652 along horizontal axis 648 may be such that the scaling of the pixels is the same at this transition area. The scaling of pixels in the portion of horizontal axis 648 that uses the logarithmic scale changes along horizontal axis 648 past the transition area.

For ranges closer to aircraft 610, linear scale 650 may be used. For ranges farther away from the aircraft, logarithmic scale 652 may be used. For example, without limitation, a range of up to about one nautical mile may be presented using linear scale 650, while a longer range, such as from about one nautical mile to about 20 nautical miles, may be presented using logarithmic scale 652. Of course, other distances may be used, depending on the particular implementation.

Linear scale 650 for the ranges closer to aircraft 610 provides a pilot with the ability to see terrain 612 near to and directly below aircraft 610. Terrain 612 near to aircraft 610 may include terrain 612 behind and/or in front of aircraft 610.

For distances farther out, a pilot or other operator may wish to see or identify terrain 612. However, at these distances, the detail or information about the terrain farther out may not be as important and compression of the logarithmic scale may leave more space in vertical profile view 608 for the ranges closer to aircraft 610. In this manner, the operator may be able to view more detail for the ranges closer to aircraft 610. In these illustrative examples, the transition from linear scale 650 to logarithmic scale 652 may be seamless or may be identified using a graphical indicator.

Additionally, in scale system 620, vertical axis 646 may be scaled to always present terrain 612 below the aircraft. In other words, vertical axis 646 may have a scale that changes such that terrain 612 is always displayed in vertical profile view 608.

In these illustrative examples, vertical axis 646 may employ relative scale 654. Relative scale 654 is scaled relative to the altitude of the aircraft. For example, relative scale 654 may show the height of the aircraft as being zero with the distances above and below the aircraft on vertical axis 646 being presented as distances relative to the aircraft.

In some illustrative examples, a pilot may select a desired minimum height and a maximum height based on the highest and lowest parts of number of curves 628. Using relative scale 654, scale system 620 may change as the aircraft moves, as current state 635 changes, as minimum clearance height 641 changes, and/or other changes occur. In other words, scale system 620 may continuously change while the aircraft is in flight. Further, scale system 620 changes automatically without human interaction. In this manner, visibility of terrain 612 in vertical profile view 608 is continuously maintained.

In these illustrative examples, scale system 620 changes by either expanding or contracting. For example, scale system 620 may expand to quickly present new terrain heights as they are encountered. In other words, scale system 620 may expand when terrain 612 with a greater range of heights is encountered. Further, scale system 620 may contract when terrain 612 with a smaller range of heights is encountered.

In these examples, scale system 620 may contract more slowly than scale system 620 expands and/or after a delay. Scale system 620 changes in a manner that prevents undesired changes, such as constantly and/or rapidly alternating between expansion and contraction.

In other advantageous embodiments, relative scale 654 may change in response to operator input. The operator input may include, for example, a change to scale system 620 for horizontal axis 648. In yet other advantageous embodiments, linear scale 650 and/or logarithmic scale 652 for horizontal axis 648 may change automatically and/or continuously in a manner similar to relative scale 654 for vertical axis 646.

In these illustrative examples, kinetic climb height indicator 616 is displayed on vertical axis 646. Kinetic climb height indicator 616 identifies the height that an aircraft can climb while the airspeed of the aircraft decreases to selected airspeed 645. In this example, at least a portion of the kinetic energy of the aircraft is converted into potential energy. This potential energy is based on the height of the aircraft. Selected airspeed 645 may be an airspeed over a stall speed of the aircraft. Selected airspeed 645 may be selected based on user input, rules, policies, safety requirements, and/or other suitable factors. For example, selected airspeed 645 may be about 20 percent or about 30 percent above a stall speed.

As the aircraft climbs, airspeed is lost. In other words, the airspeed of the aircraft may change, while the engine power remains the same, to allow the aircraft to climb to the height indicated by kinetic climb height indicator 616. A change in the current airspeed of the aircraft or a change in stall speed may change the position of kinetic climb height indicator 616 on vertical axis 646. The stall speed of the aircraft may change based on the altitude of the aircraft, the gross weight of the aircraft, the bank angle, the configuration of the aircraft, and/or other suitable factors. As one illustrative example, the configuration of the aircraft may change when flaps are deployed. This change in the configuration of the aircraft decreases the stall speed of the aircraft.

Thus, kinetic climb height indicator 616 indicates the amount of altitude an aircraft can climb rapidly without a sustained climb.

Terrain altitude indicator 618 also is presented on vertical axis 646. In other words, terrain altitude indicator 618 is a graphical indicator, on vertical profile view 608, of a current height of the terrain below the aircraft. Terrain altitude indicator 618 represents the actual altitude of terrain 612 as measured by the aircraft. The altitude may be measured using a sensor system, such as a radar system. This radar system may be implemented using, for example, radar altimeter 509 in FIG. 5.

Terrain altitude data 658 represents the estimated distance, above or below the aircraft, between the aircraft and terrain 612 depicted on vertical profile view 608. In the illustrative examples, this distance is calculated based on the position and altitude of the aircraft above the terrain in current state 635 of the aircraft. Terrain altitude data 658 is the altitude of terrain 612 below the aircraft identified using stored terrain data. In this example, terrain altitude data 658 is relative to the aircraft. Further, terrain altitude data 658 is identified using the stored terrain elevation data minus an altitude of the aircraft.

In other words, terrain altitude indicator 618 indicates an actual altitude of the aircraft above terrain 612 as compared to the altitude estimated using terrain altitude data 658.

In these illustrative examples, terrain altitude indicator 618 provides a pilot a capability to identify the accuracy of the terrain data used to present terrain 612 in vertical profile view 608. With this information, an operator may compare terrain altitude indicator 618 and terrain altitude data 658. For example, an operator may compare the terrain altitude indicator 618 and terrain altitude data 658 over time to identify the accuracy or error in vertical profile view 608. The accuracy or error being identified may be for the terrain data used to generate terrain 612 or for the position and altitude of the aircraft in current state 635. With this information, an operator may determine the reliability of terrain 612 on vertical profile view 608 and decide whether vertical profile view 608 should be used in operation of the aircraft.

Horizontal display 662 may includes a horizontal view of terrain 612 and a flight plan with a number of way points 660. The horizontal view of terrain 612 may be, for example, a bird's eye view of terrain 612. In these illustrative examples, horizontal display 662 and vertical profile view 608 may be displayed on graphical user interface 604 at the same time.

Number of way points 622 also is displayed on vertical profile view 608 in these illustrative examples. Number of way points 622 may correspond to number of way points 660 on horizontal display 662. This information may be used when turns or other maneuvers are made at number of way points 622. In other words, number of way points 622 may provide vertical profile view 608 with situational awareness of the terrain elevations under locations for upcoming turns.

In these illustrative examples, a number of way points 622 may be displayed at the same height as the aircraft. In other illustrative examples, a number of way points 622 may be displayed on vertical profile view 608 at heights relative to the altitude of the way point planned in a flight plan.

A pilot may be able modify his climb over terrain using number of way points 622 to take into account different types of situations. These situations may include, for example, without limitation, accelerated stalls, reduced climbs, and/or other situations at number of way points 622 on vertical profile view 608.

As depicted, number of turn points 624 may also be displayed on vertical profile view 608. In the illustrative examples, a turn point is presented before and after a way point in number of way points 622. Number of turn points 624 indicates one of a beginning of a turn and an ending of the turn. In these examples, the turn is associated with the way point. For example, the first turn point in number of turn points 624 before a way point in number of way points 622 indicates when the turn begins. A turn point after the way point indicates when the turn ends. A pilot may use the distance between a beginning turn point and an ending turn point for a way point in number of way points 622 to take into account different types of situations. These situations may include, for example, without limitation, accelerated stalls, reduced climbs, and/or other types of situations.

Number of terrain points 626 identifies terrain point 664 relative to a present location of aircraft 610 in terrain 612 presented on vertical profile view 608. Terrain point 664 identifies the point in terrain 612 requiring the largest immediate climb by the aircraft, for the aircraft to be able to clear the terrain 612 based on current state 635 of the aircraft and terrain 612.

In these illustrative examples, terrain point 664 is represented on vertical profile view 608 using critical terrain point indicator 665. Current state 635 of the aircraft is represented in first curve 632. Critical terrain point indicator 665 is displayed at the point of terrain 612 that is closest vertically to first curve 632 when terrain 612 does not intersect first curve 632. If terrain 612 intersects first curve 632, critical terrain point indicator 665 is displayed at the point of terrain 612 that is highest above first curve 632.

The illustration of terrain information system 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, number of processes 602 and graphical user interface 604 may be located on different types of computers. For example, terrain information system 600 may be implemented in an electronic flight bag, a cell phone with a display screen, a display computer, a flight management system, and/or some other type of computer system used with an aircraft. Additionally, in some advantageous embodiments, terrain situation information 606 may not include all of the information presented in this example. For example, in some advantageous embodiments, second curve 634 may not be used with first curve 632.

In yet other examples, number of way points 622 and number of turn points 624 may not be included in terrain situation information 606. In still other advantageous embodiments, additional information may be included. For example, without limitation, notices, such as notice to airmen (NOTAM), may be presented in a window or separate section within graphical user interface 604. In another example, these notices may be presented in a position relative to aircraft 610 on vertical profile view 608 and/or horizontal display 662.

In addition, various graphical indicators may be used to distinguish or identify the different types of terrain situation information 606. For example, different types of terrain 612 may be indicated using different colors, cross hatching, shading, or other suitable types of graphical indicators. In addition, information that is more important may be given more emphasis through other indicators, such as flashing text, flashing icons, sound, and other suitable types of indicators.

Figure 7:
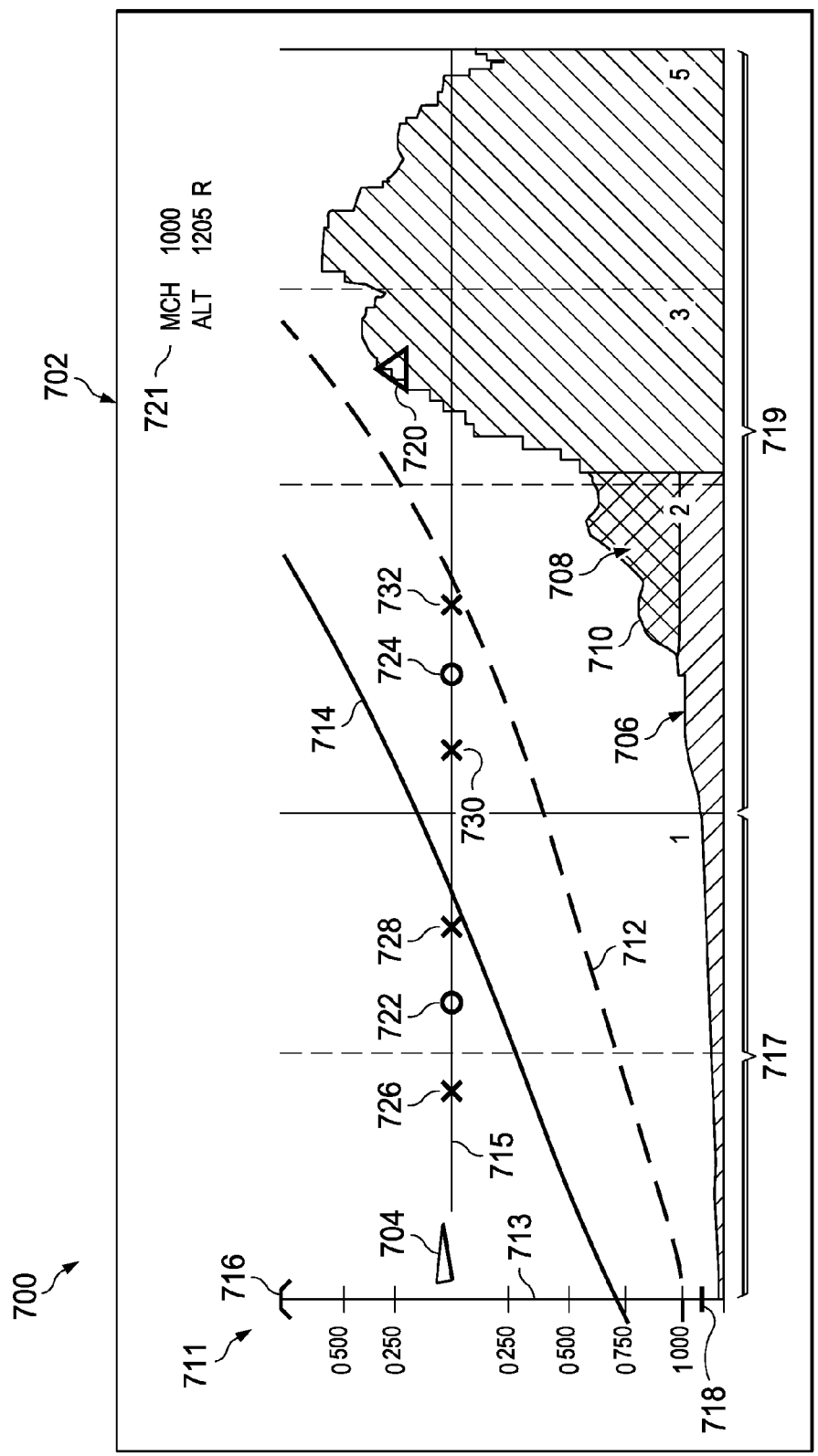
FIG. 7 is an illustration of a graphical user interface in accordance with an advantageous embodiment.

With reference now to FIG. 7, an illustration of a graphical user interface is depicted in accordance with an advantageous embodiment. In this illustrative example, graphical user interface 700 is an example of one implementation for graphical user interface 324 in FIG. 3, graphical user interface 522 in FIG. 5, and graphical user interface 604 in FIG. 6.

Graphical user interface 700 presents terrain situation information in the form of vertical profile view 702 in these examples. Vertical profile view 702 includes aircraft 704 displayed in a position relative to terrain 706. As depicted, terrain 706 is depicted as shaded area 708 under terrain curve 710. Shaded area 708 has different levels of shading in these examples.

In this illustrative example, vertical profile view 702 has scaling system 711. Scaling system 711 has vertical axis 713 and horizontal axis 715. Portion 717 of horizontal axis 715 uses a linear scale, and portion 719 of horizontal axis 715 uses a logarithmic scale in this illustrative example.

In this depicted example, vertical profile view 702 includes first curve 712 and second curve 714. First curve 712 identifies the maximum height over which aircraft 704 can clear by minimum clearance height 721 when climbing and then change to substantially level flight. In this example, minimum clearance height 721 is about 1,000 feet. Second curve 714 identifies the maximum height over which aircraft 704 can clear by about 70 percent of minimum clearance height 721, in this illustrative example, taking into account whether aircraft 704 can change to substantially level flight.

An operator of the aircraft may be able to compare first curve 712 and second curve 714 with terrain curve 710 in vertical profile view 702. For example, an operator may compare these curves to determine when and by how much distance aircraft 704 may need to clear upcoming terrain.

Further, in this illustrative example vertical profile view 702 also includes kinetic climb height indicator 716, terrain altitude indicator 718, and terrain point 720. Kinetic climb height indicator 716 identifies the altitude to which aircraft 704 can climb while the airspeed of aircraft 704 decreases. The airspeed of aircraft 704 may decrease without substantially changing engine power or while in a sustained climb. Kinetic climb height indicator 716 may have different shapes and/or sizes. As one example, kinetic climb height indicator 716 may be a straight line segment when the kinetic climb height is within the range of vertical axis 713 and a curved segment when the kinetic climb height is greater than the range of vertical axis 713.

Terrain altitude indicator 718 indicates a measured altitude of terrain 706. Terrain point 720 identifies the terrain point requiring the largest immediate climb to be cleared by aircraft 704 based on the current state of the aircraft. The current state of the aircraft may be, for example, current state 312 in FIG. 3.

As depicted, vertical profile view 702 presents way point 722 and way point 724. Vertical profile view 702 also presents turn points 726 and 728 for way point 722 and turn points 730 and 732 for way point 724.

Vertical profile view 702, in these examples, is presented at one point in time. Along a flight path of aircraft 704, vertical profile view 702 may change in response to changes in the terrain situation information over time. For example, the climb capability of the aircraft may change in response to changes in the state of the aircraft.

As a specific example, when the gross weight of the aircraft changes, first curve 712 and/or second curve 714 may change. The gross weight of the aircraft may change in response to the use of fuel during flight, the loading and/or unloading of cargo during flight, or some other suitable reason. Changes in the gross weight of the aircraft may also affect the position of terrain point 720 on terrain 706 in vertical profile view 702.

As yet another example, when the airspeed of the aircraft changes, the position of kinetic climb height indicator 716 may change. Changes in the ground speed of the aircraft may also change the positioning of first curve 712 and/or second curve 714.

Figure 8:
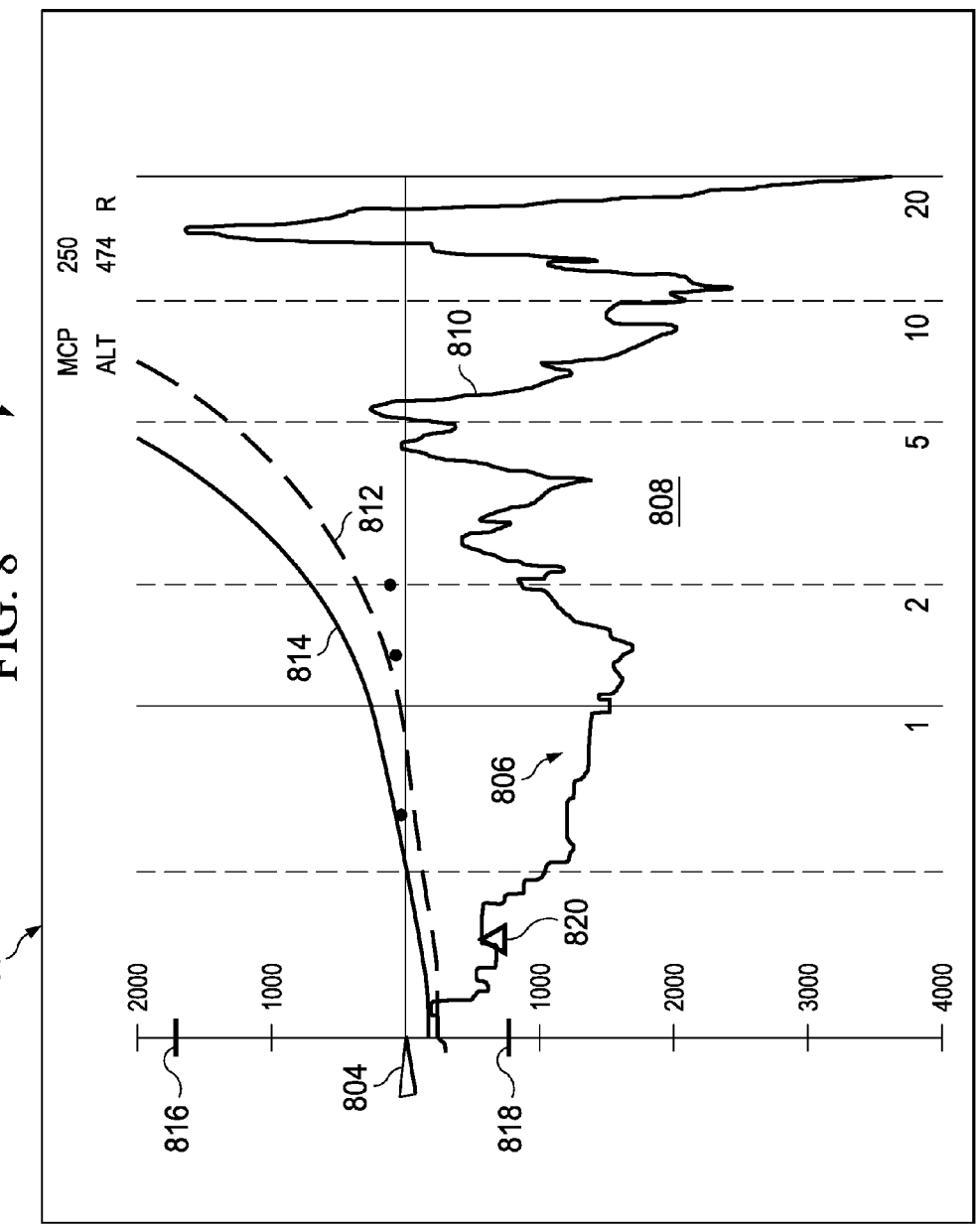
FIG. 8 is an illustration of a graphical user interface in accordance with an advantageous embodiment.

With reference now to FIG. 8, an illustration of a graphical user interface is depicted in accordance with an advantageous embodiment. In this illustrative example, graphical user interface 800 is an example of one implementation for graphical user interface 324 in FIG. 3, graphical user interface 522 in FIG. 5, and graphical user interface 604 in FIG. 6. Further, graphical user interface 800 may be similar to graphical user interface 700 in FIG. 7. Graphical user interface 800 may be implemented in a computer system, such as computer system 308 in FIG. 3.

In this illustrative example, graphical user interface 800 presents vertical profile view 802. Vertical profile view 802 includes aircraft 804 displayed in a position relative to terrain 806. As depicted, terrain 806 is depicted as area 808 under terrain curve 810. In this depicted example, terrain 806 is presented as area 808 under terrain curve 810 as compared to shaded area 708 under terrain curve 710 for terrain 706 in FIG. 7.

As depicted, vertical profile view 802 also includes first curve 812 and second curve 814. Further, in this illustrative example, vertical profile view 802 presents kinetic climb height indicator 816, terrain altitude indicator 818, and terrain point 820. Kinetic climb height indicator 816 identifies the height that aircraft 804 can climb while the airspeed of aircraft 804 decreases to a selected airspeed. Terrain altitude indicator 818 indicates a measured altitude of terrain 806. Terrain point 820 identifies the terrain point requiring the largest immediate climb to be cleared by aircraft 804 based on the present state of the aircraft.

The illustration of graphical user interface 700 in FIG. 7 and graphical user interface 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments.

For example, in other advantageous embodiments, vertical profile view 802 may be presented in a number of different ways using graphical user interface 800. For example, in some advantageous embodiments, some portions of terrain 806 under terrain curve 810 may be shaded or colored, while other portions may not be shaded. As a specific example, portions of terrain 806 representing heights above a selected height may be shaded. For example, in another advantageous embodiment, some portions of terrain curve 810 may be colored. The colors may be selected to represent a source or quality of the terrain data depicted or the relative height of the terrain to the aircraft.

In still other advantageous embodiments, other types of indicators in addition to or in place of the ones depicted may be present in vertical profile view 802.

Figure 9:
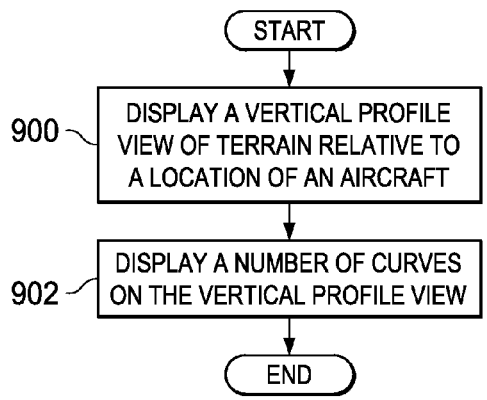
FIG. 9 is an illustration of a flowchart of a process for presenting information about a terrain in accordance with an advantageous embodiment.

With reference now to FIG. 9, an illustration of a flowchart of a process for presenting information to operate an aircraft over terrain is depicted in accordance with an advantageous embodiment. The process illustrated in FIG. 9 may be implemented using number of processes 316 in terrain information system 304 to operate aircraft 302 in FIG. 3. Further, this process may be implemented using number of processes 520 in terrain information system 500 in FIG. 5 and number of processes 602 in terrain information system 600 in FIG. 6.

The process begins by displaying a vertical profile view of terrain relative to a location of an aircraft (operation 900). This vertical profile view may be implemented using vertical profile view 608 in FIG. 6. The vertical profile view may take the form of, for example, vertical profile view 702 in FIG. 7 or vertical profile view 802 in FIG. 8.

The process then displays a number of curves on the vertical profile view (operation 902), with the process terminating thereafter. The number of curves in operation 902 identifies a maximum height of the terrain that the aircraft can clear based on a current state of the aircraft. The current state of the aircraft may be, for example, current state 312 in FIG. 3. For example, the number of curves may include first curve 632 and second curve 634 in FIG. 6.

Figure 10:
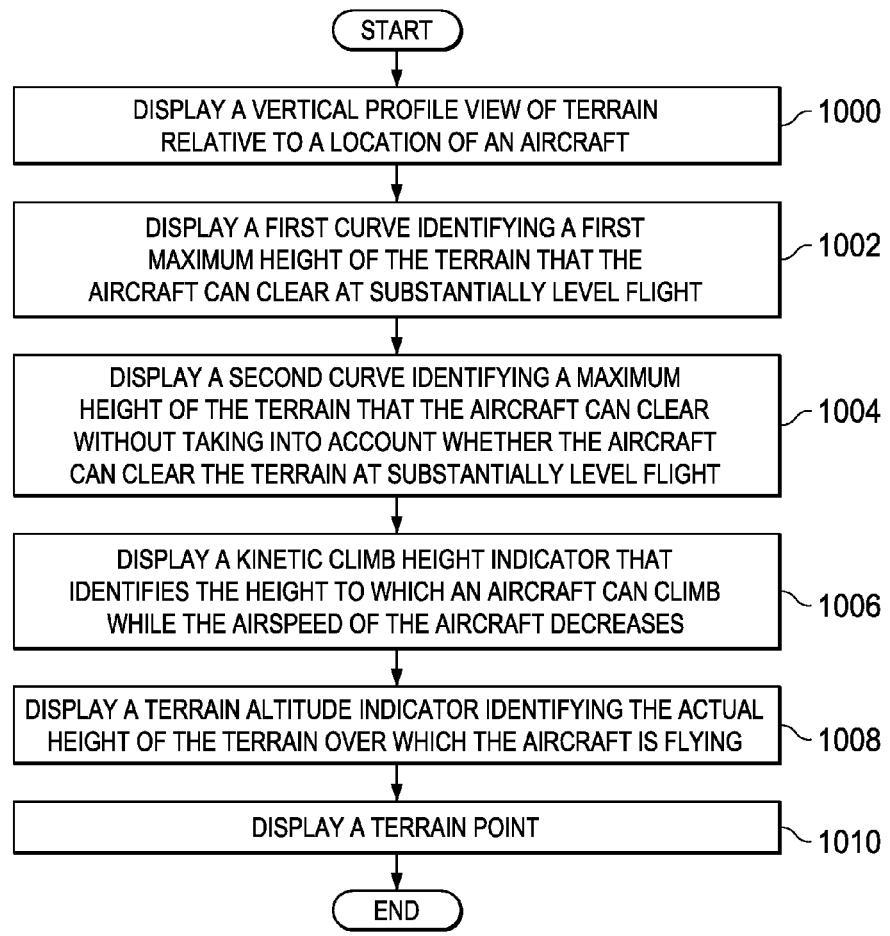
FIG. 10 is an illustration of a flowchart of a process for presenting information about a terrain in accordance with an advantageous embodiment.

With reference now to FIG. 10, an illustration of a flowchart of a process for presenting information about a terrain is depicted in accordance with an advantageous embodiment. The process illustrated in FIG. 10 may be implemented using number of processes 326 in terrain information system 304 in terrain information environment 300 in FIG. 3. Further, this process may be implemented using number of processes 520 in terrain information system 500 in FIG. 5 and number of processes 602 in terrain information system 600 in FIG. 6.

The process begins by displaying a vertical profile view of terrain relative to a location of an aircraft (operation 1000). This vertical profile view may be implemented using vertical profile view 608 in FIG. 6. More specifically, the vertical profile view may be implemented using vertical profile view 702 in FIG. 7 or vertical profile view 802 in FIG. 8.

Thereafter, the process then displays a first curve identifying a first maximum height of the terrain that the aircraft can clear at substantially level flight (operation 1002). The process then displays a second curve identifying a second number of maximum heights of the terrain that the aircraft can clear without taking into account whether the aircraft can clear the terrain at substantially level flight (operation 1004). In operations 1002 and 1004, the first curve and the second curve are based on the state of the aircraft. The state of the aircraft may be, for example, current state 312 in FIG. 3. Further, the state of the aircraft may comprise at least one of an aircraft condition, an aircraft position, an aircraft movement, an aircraft system status, atmospheric measurements, design characteristics of the aircraft, an/or other suitable information.

The process then displays a kinetic climb height indicator that identifies the height to which an aircraft can climb while the airspeed of the aircraft decreases (operation 1006). The airspeed of the aircraft may decrease without substantially changing engine power. The selected airspeed may be some airspeed greater than a stall speed for the aircraft. The process displays a terrain altitude indicator identifying the actual height of the terrain over which the aircraft is flying (operation 1008).

Thereafter, the process displays a terrain point (operation 1010), with the process terminating thereafter. The terrain point identified may be the terrain point requiring the largest current climb angle to be cleared by the aircraft based on the current state of the aircraft.

For example, a graphical indicator may be displayed on the terrain curve at a point closest to the first curve 1002 if the first curve is above the terrain curve. Further, a graphical indicator may be displayed on the terrain curve at the point having a highest height above the first curve 1002 if the first curve intersects the terrain curve.

Figure 11:
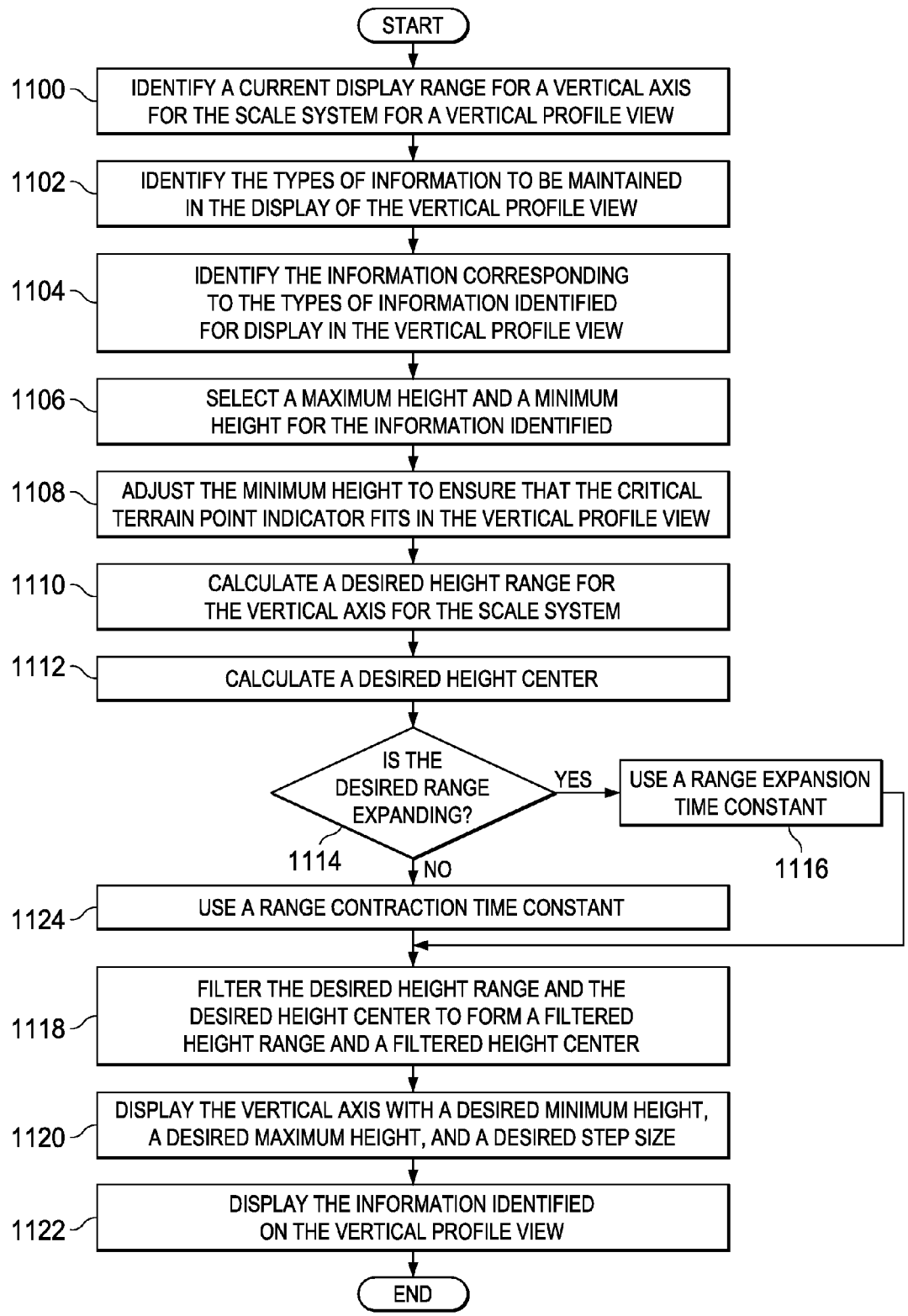
FIG. 11 is an illustration of a process for changing the scale system for a vertical profile view in accordance with an advantageous embodiment.

With reference now to FIG. 11, an illustration of a flowchart of a process for changing the scale system for a vertical profile view is depicted in accordance with an advantageous embodiment. In this illustrative example, the process illustrated in FIG. 11 may be implemented in computer system 308 in FIG. 3. Further, this process may be implemented to change scale system 620 for vertical profile view 608 to display desired terrain situation information in vertical profile view 608. As a specific example, this process may be implemented to change the scale and/or labels of vertical axis 713 in vertical profile view 702.

The process begins by identifying a current display range for a vertical axis for the scale system for a vertical profile view (operation 1100). The current display range may be in, for example, inches, centimeters, or pixels. In these illustrative examples, the vertical axis may represent altitude in feet, miles, kilometers, or some other suitable type of measurement.

The process then identifies the types of information to be maintained in the display of vertical profile view (operation 1102). The types of information may include, for example, without limitation, a profile of terrain, a minimum distance above and/or below an aircraft, a minimum clearance height setting, a terrain altitude identified by a sensor, and/or other suitable types of data. In operation 1102, the types of information to be kept displayed in the vertical profile view may be identified based on user input, policies, a database, or other suitable factors.

Thereafter, the process identifies the information corresponding to the types of information identified for display in the vertical profile view (operation 1104). For example, in operation 1104, the process identifies information within the range of the horizontal axis for the vertical profile view. In operation 1104, at least a portion of the information is identified from stored terrain data.

The process then selects a maximum height and a minimum height for the information identified (operation 1106). The process adjusts the minimum height to ensure that the terrain point indicator fits in the vertical profile view (operation 1108).

Thereafter, the process calculates a desired range for the vertical axis for the scale system (operation 1110). In operation 1110, the desired height range is calculated using the following:

$$\text{desired height range} = (\text{maximum height} - \text{minimum height})/P_{RT}$$

where maximum height is the maximum height identified in operation 1106, minimum height is the adjusted minimum height in operation 1108, and $P_{RT}$ is a target percentage of a display to use. For example, the target percentage of a display may be the percentage of a display screen to be used for displaying the information identified in operation 1104 to be kept within the vertical profile view.

The process then calculates a desired height center (operation 1112). In operation 1112, the desired height center is calculated using the following:

desired height center=(maximum height+minimum height)/2.

The process then determines whether the desired height range is expanding (operation 1114). In operation 1114, this determination is made by comparing the desired range for the vertical axis for the scale system calculated in operation 1110 with a previous height range displayed in the vertical profile view. If the desired height range is expanding, the process uses a range expansion time constant to adjust the expansion (operation 1116). The range expansion time constant ensures that the range for the vertical axis of the scale system expands more rapidly than desired. If the range for the vertical axis expands too rapidly or alternates between expansion and contraction too rapidly, an operator of the aircraft may not be able to view the vertical profile view as well as desired.

The process then filters the desired height range and the desired height center to form a filtered height range and a filtered height center (operation 1118). For example, in operation 1118, the filtering process may be performed using a second order linear filter. In operation 1118, the filtering of the desired height range is performed using, for example, the range expansion time constant calculated in operation 1116.

Thereafter, the process displays the vertical axis with a desired minimum height, a desired maximum height, and a desired step size (operation 1120). The desired maximum height is calculated as follows:

desired maximum height=filtered height center+filtered height range/2)

where filtered height center is the filtered height center in operation 1118 and filtered height range is the filtered height range in operation 1118.

The desired minimum height is calculated as follows:

desired minimum height=filtered height center−(filtered height range/2).

The desired step size is calculated as follows:

height scale=current display range/filtered range and desired step size=MDS/height scale where MDS is a minimum display space between vertical axis labels. In other words, MDS is the minimum display space desired for the display screen between two labels or indicators on a vertical axis.

The process displays the information identified in the vertical profile view (operation 1122), with the process terminating thereafter.

With reference again to operation 1114, if the desired height range calculated in operation 1110 is not expanding, the process uses a range contraction time constant to adjust this contraction (operation 1124). The range contraction time constant is used to ensure that the range for the vertical axis of the scale system contracts as rapidly as desired.

For example, if the range for the vertical axis contracts too rapidly or alternates between expansion and contraction too rapidly, an operator of the aircraft may not be able to view the vertical profile view as well as desired. Thereafter, the process continues to operation 1118 as described above.

The range contraction time constant calculated in operation 1124 may be used to perform operation 1118. This range contraction time constant is used in place of the range expansion time constant in operation 1118. In some illustrative examples, the filtering performed in operation 1118 may use non-linear elements, such as, for example, a time delay prior to range contraction.

The process illustrated in FIG. 11 may also be applied to other axes, such as, for example, a horizontal axis. Further, this process may be used to maintain a desired view in the vertical profile view. The desired view may be based on any of a number of criteria.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for presenting pilots with an awareness of their vertical situation. The information may be provided on a continual basis to show a comparison of the energy state and climb capability of the aircraft with respect to terrain that is ahead of the aircraft. In one or more advantageous embodiments, a vertical profile view of the terrain is displayed relative to a location of an aircraft. A number of curves on the vertical profile view are displayed. The number of curves identifies the maximum height of terrain that the aircraft can clear based on the state of the aircraft.

The different advantageous embodiments provide a terrain information system that allows pilots of aircraft to have terrain information with respect to their vertical situation during flight that is continuously updated. The type of system allows the pilot to more accurately maneuver over the terrain during flight, as compared to currently used systems. Further, this type of system reduces the amount of guesswork and/or estimation involved in a pilot maneuvering over terrain. The terrain information system described in these advantageous embodiments also helps the pilots determine which terrain points are the most critical for the aircraft to clear.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, to keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. For example, although the different advantageous embodiments are described with respect to a vehicle in the form of an aircraft, other advantageous embodiments may be applied to other types of vehicles. For example, without limitation, vertical situation information may be presented for a spacecraft, a submarine, or some other type of aircraft.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for presenting information to operate an aircraft over terrain, the method comprising:
    displaying a vertical profile view of the terrain relative to a location of the aircraft; and
    displaying a number of curves on the vertical profile view, wherein the number of curves identifies a number of maximum heights of the terrain that the aircraft can clear based on a current state of the aircraft.

2. The method of claim 1, wherein the step of displaying the number of curves on the vertical profile view, wherein the number of curves identifies the number of maximum heights of the terrain that the aircraft can clear based on the current state of the aircraft comprises:
    displaying a curve on the vertical profile view, wherein the curve identifies the number of maximum heights of the terrain that the aircraft can clear by climbing and then changing to a substantially level flight, and wherein the curve is based on the current state of the aircraft and a minimum clearance height.

3. The method of claim 2, wherein the curve is a first curve and the number of maximum heights is a first number of maximum heights, and wherein the step of displaying the number of curves on the vertical profile view, wherein the number of curves identifies the number of maximum heights of the terrain that the aircraft can clear based on the current state of the aircraft and the minimum clearance height further comprises:
    displaying a second curve on the vertical profile view, wherein the second curve identifies a second number of maximum heights of the terrain that the aircraft can clear by climbing without taking into account whether the aircraft can change to the substantially level flight and wherein the second curve is based on the current state of the aircraft and the minimum clearance height.

4. The method of claim 3, wherein the current state of the aircraft comprises at least one of a position of the aircraft, a status of the aircraft, a condition of the aircraft, atmospheric measurements, design characteristics of the aircraft, a current airspeed of the aircraft, a current ground speed of the aircraft, a current stall speed of the aircraft, a current density of the atmosphere surrounding the aircraft, a bank angle of the aircraft, a position of flaps, a position of slats, and a gross weight of the aircraft.

5. The method of claim 1, wherein the step of displaying the number of curves on the vertical profile view, wherein the number of curves identifies the number of maximum heights of the terrain that the aircraft can clear based on the current state of the aircraft comprises:
    displaying the number of curves on the vertical profile view, wherein the number of curves identifies the number of maximum heights of the terrain that the aircraft can clear based on the current state of the aircraft and a number of future states of the aircraft.

6. The method of claim 5, wherein the number of future states of the aircraft is based on at least one of the current state of the aircraft, a flight plan for the aircraft, and user input.

7. The method of claim 1 further comprising:
    displaying a graphical indicator on a vertical axis, wherein the graphical indicator represents a kinetic climb height to which the aircraft can climb while an airspeed of the aircraft decreases to a selected airspeed without substantially changing engine power.

8. The method of claim 7 further comprising:
    responsive to the kinetic climb height being less than a current height of the aircraft, generating an alert indicating that a current speed of the aircraft is too slow.

9. The method of claim 2 further comprising:
    responsive to a portion of the terrain being above the curve, generating an alert indicating that the substantially level flight cannot occur after clearing the portion the terrain for the current state of the aircraft.

10. The method of claim 3 further comprising:
responsive to a portion of the terrain being above the second curve, generating an alert indicating that the aircraft cannot clear the terrain for the current state of the aircraft.

11. The method of claim 1 further comprising:
displaying a graphical indicator of a current height of the terrain below the aircraft relative to the terrain below the aircraft on the vertical profile view.

12. The method of claim 11, wherein the current height of the terrain below the aircraft is detected using a sensor associated with the aircraft.

13. The method of claim 1 further comprising:
displaying a range on a horizontal axis in the vertical profile view of the terrain, wherein a first portion of the horizontal axis has a linear scale and a second portion of the horizontal axis has a logarithmic scale.

14. The method of claim 1 further comprising:
displaying height on a vertical axis in the vertical profile view of the terrain, wherein a scale of the vertical axis changes such that the terrain is always displayed.

15. The method of claim 1 further comprising:
displaying a number of way points in the vertical profile view of the terrain.

16. The method of claim 15 further comprising:
displaying a number of turn points in the vertical profile view of the terrain, wherein each turn point identifies one of a beginning of a turn and an ending of the turn.

17. The method of claim 2 further comprising:
displaying a graphical indicator on the terrain at a point closest to the curve if the curve is above the terrain; and
displaying the graphical indicator on the terrain at the point having a highest height above the curve if the curve intersects the terrain.

18. The method of claim 1, wherein the current state of the aircraft is identified from at least one of information received from a number of sensors associated with the aircraft, a flight plan, and a user input.

19. A method for presenting information about terrain, the method comprising:
displaying a vertical profile view of the terrain relative to a location of a vehicle; and
displaying a number of curves on the vertical profile view, wherein the number of curves identifies a number of maximum heights of the terrain that the vehicle can clear based on a current state of the vehicle.

20. The method of claim 19, wherein a curve in the number of curves is based on the current state of the vehicle and a minimum clearance height.

21. The method of claim 19, wherein the vehicle is selected from a group comprising an aircraft, an airplane, a helicopter, an unmanned aircraft system, a submarine, an unmanned underwater vehicle, and a spacecraft.

22. An apparatus comprising:
a display device;
a storage device;
program code stored on the storage device; and
a processor unit configured to run the program code to display a vertical profile view of terrain relative to a location of an aircraft on the display device; and display a number of curves on the vertical profile view on the display device, wherein the number of curves identifies a number of maximum heights of the terrain that the aircraft can clear based on a current state of the aircraft.

23. The apparatus of claim 22, wherein in running the program code to display the number of curves on the vertical profile view, wherein the number of curves identifies the number of maximum heights of the terrain that the aircraft can clear based on the current state of the aircraft, the processor unit is configured to run the program code to display a curve on the vertical profile view, wherein the curve identifies the number of maximum heights of the terrain that the aircraft can clear by climbing and then changing to a substantially level flight, and wherein the curve is based on the current state of the aircraft and a minimum clearance height.

24. The apparatus of claim 23, wherein the curve is a first curve and the number of maximum heights is a first number of maximum heights, and wherein in running the program code to display the number of curves on the vertical profile view, wherein the number of curves identifies the maximum height of the terrain that the aircraft can clear based on the current state of the aircraft and the minimum clearance height, the processor unit is configured to run the program code to display a second curve on the vertical profile view, wherein the second curve identifies a second number of maximum heights of the terrain that the aircraft can clear by climbing without taking into account whether the aircraft can change to the substantially level flight and wherein the second curve is based on the current state of the aircraft and the minimum clearance height.

25. The apparatus of claim 24, wherein the current state of the aircraft comprises at least one of a position of the aircraft, a status of the aircraft, a condition of the aircraft, atmospheric measurements, design characteristics of the aircraft, a current airspeed of the aircraft, a current ground speed of the aircraft, a current stall speed of the aircraft, a current density of the atmosphere surrounding the aircraft, a bank angle of the aircraft, a position of flaps, a position of slats, and a gross weight of the aircraft.

26. The apparatus of claim 22, wherein the processor unit is configured to display a graphical indicator on a vertical axis, wherein the graphical indicator represents a kinetic climb height to which the aircraft can climb by reducing an airspeed of the aircraft to a selected airspeed.

27. The apparatus of claim 26, wherein the processor unit is configured to run the program code to generate an alert indicating that a current speed of the aircraft is too slow in response to the kinetic climb height being less than a current height of the aircraft.

28. The apparatus of claim 23, wherein the processor unit is configured to run the program code to generate an alert indicating that the substantially level flight cannot occur after clearing a portion of the terrain for the current state of the aircraft in response to the portion of the terrain being above the curve.

29. The apparatus of claim 24, wherein the processor unit is configured to run the program code to generate an alert indicating that the aircraft cannot clear the terrain for the current state of the aircraft to a portion of the terrain being above the second curve.

30. The apparatus of claim 22, wherein the processor unit is configured to run the program code to display a graphical indicator of a current height of the terrain below the aircraft relative to the terrain below the aircraft on the vertical profile view.

31. The apparatus of claim 30, wherein the current height of the terrain below the aircraft is detected using a sensor associated with the aircraft.

32. The apparatus of claim 22, wherein the processor unit is configured to run the program code to display a range on a horizontal axis in the vertical profile view of the terrain, wherein a first portion of the horizontal axis has a linear scale and a second portion of the horizontal axis has a logarithmic scale.

33. The apparatus of claim 22, wherein the processor unit is configured to run the program code to display height on a vertical axis in the vertical profile view of the terrain, wherein a scale of the vertical axis changes such that the terrain is always displayed.

34. The apparatus of claim 22, wherein the processor unit is configured to run the program code to display a number of way points in the vertical profile view of the terrain.

35. The apparatus of claim 34, wherein the processor unit is configured to run the program code to display a number of turn points in the vertical profile view of the terrain, wherein each turn point identifies one of a beginning of a turn and an ending of the turn.

36. The apparatus of claim 23, wherein the processor unit is configured to run the program code to display a graphical indicator on the terrain at a point closest to the curve if the curve is above the terrain; and display the graphical indicator on the terrain at the point having a highest height above the curve if the curve intersects the terrain.

37. The apparatus of claim 22, wherein the current state of the aircraft is identified from at least one of information received from a number of sensors associated with the aircraft, a flight plan, and a user input.

* * * * *